(12) United States Patent
Gentsch et al.

(10) Patent No.: US 7,852,180 B2
(45) Date of Patent: Dec. 14, 2010

(54) METHOD FOR PRODUCING BREAKER POLE PARTS FOR LOW-VOLTAGE, MEDIUM-VOLTAGE AND HIGH-VOLTAGE SWITCHGEAR ASSEMBLIES, AND BREAKER POLE PART ITSELF

(75) Inventors: Dietmar Gentsch, Bochum (DE); Oliver Claus, Ratingen (DE)

(73) Assignee: ABB Technology AG, Zurich (CH)

( * ) Notice: Subject to any disclaimer, the term of this patent is extended or adjusted under 35 U.S.C. 154(b) by 279 days.

(21) Appl. No.: 12/071,573

(22) Filed: Feb. 22, 2008

(65) Prior Publication Data

US 2008/0142485 A1 Jun. 19, 2008

Related U.S. Application Data

(63) Continuation of application No. PCT/EP2006/008195, filed on Aug. 21, 2006.

(30) Foreign Application Priority Data

Aug. 22, 2005 (DE) .................. 10 2005 039 555

(51) Int. Cl.
*H01H 9/30* (2006.01)
*H01H 33/66* (2006.01)

(52) U.S. Cl. .................. 335/201; 218/118; 218/134; 264/255

(58) Field of Classification Search ......... 335/200–204; 218/118, 134; 264/255, 279, 279.1, 328.1, 264/328.2, 328.8, 328.18
See application file for complete search history.

(56) References Cited

U.S. PATENT DOCUMENTS

| | | | | |
|---|---|---|---|---|
| 3,812,314 A | * | 5/1974 | Nonken | .................. 218/138 |
| 3,955,167 A | * | 5/1976 | Kumbera | .................. 337/188 |
| 4,740,344 A | * | 4/1988 | Wollbeck et al. | ............ 264/248 |
| 5,012,182 A | * | 4/1991 | Fujiki et al. | .................. 324/96 |
| 5,979,931 A | * | 11/1999 | Totani et al. | ............. 280/728.3 |
| 6,562,884 B1 | * | 5/2003 | Tang et al. | .................. 523/443 |
| 2004/0182606 A1 | * | 9/2004 | Goldman et al. | ............. 175/39 |
| 2005/0151299 A1 | * | 7/2005 | Rogerson | .................... 264/259 |

FOREIGN PATENT DOCUMENTS

| | | |
|---|---|---|
| DE | 1 807 594 A | 2/1970 |
| DE | 2 240 106 A | 3/1973 |
| DE | 299 02 214 U1 | 6/1999 |

(Continued)

OTHER PUBLICATIONS

International Search Report dated Nov. 28, 2006.

(Continued)

*Primary Examiner*—Elvin G Enad
*Assistant Examiner*—Bernard Rojas
(74) *Attorney, Agent, or Firm*—Buchanan Ingersoll & Rooney PC

(57) ABSTRACT

The disclosure relates to a method for producing circuit-breaker parts and plastic components for low, medium and high-voltage switching stations and to a corresponding circuit-breaker part. To obtain a simpler method of production with a higher variance of material characteristics, the outer insulation sleeve is produced in a plastic injection molding method, in which a vacuum interrupter chamber is sheathed in plastic.

24 Claims, 2 Drawing Sheets

FOREIGN PATENT DOCUMENTS

| | | |
|---|---|---|
| DE | 102 49 615 A1 | 5/2004 |
| DE | 10 2004 060 274 A1 | 6/2006 |
| EP | 0 319 659 A3 | 6/1989 |
| EP | 1 107 409 A1 | 6/2001 |
| EP | 1 150 405 A2 | 10/2001 |
| EP | 1 229 563 A1 | 8/2002 |
| EP | 1 367 681 A1 | 3/2003 |
| EP | 1 453 164 A1 | 9/2004 |
| WO | WO 2004/038748 A1 | 3/2004 |

OTHER PUBLICATIONS

German Search Report for 10 2005 039 555.4-34 dated Aug. 15, 2006.

* cited by examiner

METHOD FOR PRODUCING BREAKER POLE PARTS FOR LOW-VOLTAGE, MEDIUM-VOLTAGE AND HIGH-VOLTAGE SWITCHGEAR ASSEMBLIES, AND BREAKER POLE PART ITSELF

RELATED APPLICATIONS

This application claims priority under 35 U.S.C. §119 to German Application DE 10 2005 039 555.4 filed in Germany on Aug. 22, 2005, and as a continuation application under 35 U.S.C. §120 to PCT/EP2006/008195 filed as an International Application on Aug. 21, 2006, designating the U.S., the entire contents of which are hereby incorporated by reference in their entireties.

TECHNICAL FIELD

A method for producing breaker pole parts for low-voltage, medium-voltage and high-voltage breakers and assemblies, and breaker pole part itself is disclosed.

BACKGROUND INFORMATION

Breaker pole parts or plastic component part units of the type described at the outset include vacuum interrupter chambers which are embedded in insulating material or are encapsulated with said material. The vacuum interrupter chambers (VK) themselves substantially comprise a ceramic material (insulator), which is generally cylindrical and is closed at the ends in most cases by a metallic cover. A folding bellows is arranged on the cover on the movable side(s), which folding bellows permits a movement of one or else both contact pieces over a current feed line within the vacuum interrupter chamber. The current feed line is guided via a drive rod in such a way that the contact pieces can be opened or closed within the vacuum of the VK. As mentioned, a vacuum atmosphere is located within the vacuum interrupter chambers in order that as rapid quenching as possible of the arc produced during switching-on and switching-off can be ensured.

These vacuum interrupter chambers are generally encapsulated by a thermosetting-plastic epoxy resin mixture (at ambient pressure or a few bar), which mixture contributes to increasing the external dielectric strength of a vacuum interrupter chamber and takes on mechanical functions. Furthermore, the vacuum interrupter chamber can be encased by a rubber-elastic material likewise for the purpose of increasing the external dielectric strength.

The ceramic insulator of a vacuum interrupter chamber and the encapsulating epoxy resin have a markedly different coefficient of thermal expansion, however, which results in the fact that, if the vacuum interrupter chambers are cast directly into epoxy resin, this epoxy resin sleeve remains sensitive to cracks given corresponding thermal cycling. In addition, the production process is matched to the casting resin encapsulating material. The production times (cycle time) of each component part, for example produced in the vacuum casting process or pressure gelation process, are correspondingly long until curing of the component part and its removal.

In order to avoid possible initiation of cracks, it is known and provided in the prior art to introduce a so-called damping layer or a compensating layer for the purpose of compensating for these different coefficients of thermal expansion between the vacuum interrupter chamber surface and the epoxy resin sleeve. For this purpose, elastomers such as rubber or hard rubber materials are usually used which are in the form of collars or have previously been cast on and applied over the vacuum interrupter chambers before the latter are introduced into a corresponding casting mold and are encapsulated with epoxy resin (usually with a filler). Said compensating layer is in this case also cast into the composite produced.

This manufacturing process which is advantageous per se prevents the possibility of cracking of the epoxy resin casing occurring after casting or given thermal cycling.

The production of an epoxy resin casing as such remains extremely complex, however.

SUMMARY

A method for producing vacuum interrupter chamber pole parts is disclosed to such an extent that the manufacturing process is in itself simpler and the breaker pole part thus produced meets all technical requirements, and a corresponding breaker pole part is provided. 0.

A method for producing breaker pole parts is disclosed with a vacuum interrupter chamber and an external insulating sleeve for medium-voltage and high-voltage breakers, wherein the external insulating sleeve is produced in a plastic injection-molding process by the vacuum chamber being encapsulated by injection molding.

A breaker pole part is disclosed with a vacuum interrupter chamber and an insulating sleeve for medium-voltage and high-voltage breakers, wherein the external insulating sleeve comprises a layer which has been applied to the vacuum chamber in a plastic injection-molding process.

BRIEF DESCRIPTION OF THE DRAWINGS

The disclosure is illustrated in the drawings and described in more detail below.

DETAILED DESCRIPTION

Figure 1:
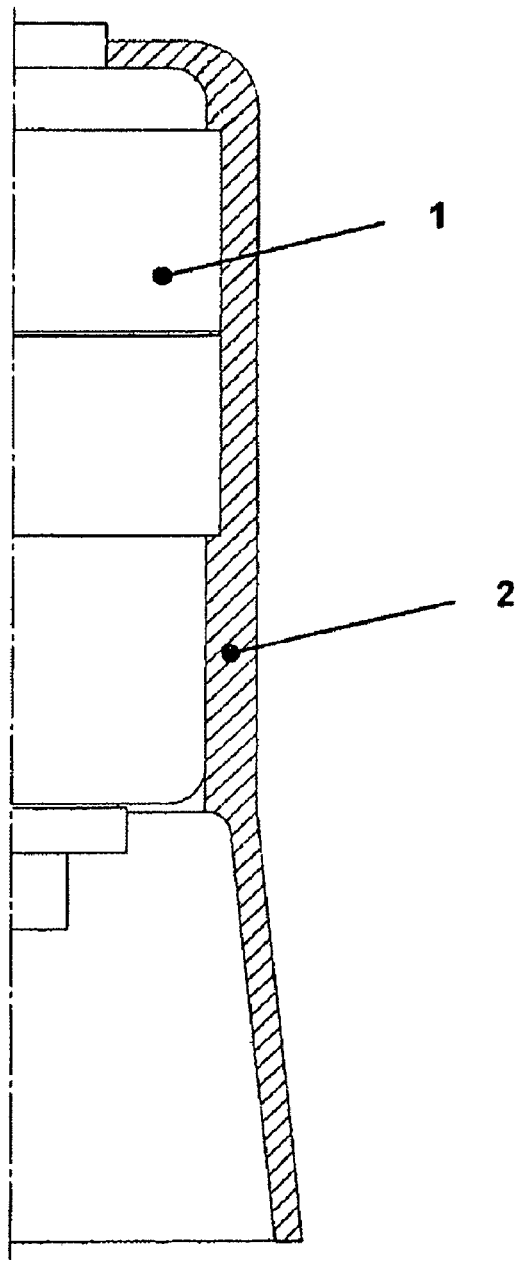
FIG. 1 shows a sectional illustration of a pole part with a vacuum interrupter chamber,
FIG. 2 with a compensating layer,
FIG. 3 with a multi-layered plastic coating, and
FIG. 4 with a gradient region.

The essence of the disclosure as regards the method is in this case that the external insulating sleeve is produced in a plastic injection-molding process by a vacuum interrupter chamber being encapsulated by injection molding. In this case, the particular feature consists in the use of the injection-molding technology. This is a considerable distinction from the epoxy resin casting technology. Pressures of the order of magnitude of greater than 80 bar are generally used in the plastic injection molding. The process temperatures are approximately 160° C. Encapsulating a vacuum interrupter chamber by injection molding under these conditions, in particular at these pressures, has until now been avoided since firstly the vacuum interrupter, which substantially comprises ceramic material, cannot withstand this pressure and secondly at least the vacuum interrupter chamber could no longer have a sufficient vacuum atmosphere after this process. However, initial considerations especially with respect to practical experiments have shown that this is possible contrary to the technical expectations.

The path is thus cleared to various possibilities in terms of manufacturing technology. This also includes the fact that the insulating and dielectric properties which can generally be achieved by means of plastic are optimal. However, of very particular advantage is the thermal expansion behavior of the plastics which can be processed and used in this way. The enveloping of the vacuum interrupter chamber produced using plastic injection molding therefore cumulatively meets all the requirements and furthermore the material parameters which can now be set are extremely variable and can be matched to the technical requirements.

By using this technology in accordance with the disclosure, the path is now cleared for several possibilities even with respect to the variance of materials which can be used.

In this case, a large number of known thermoplastics can now be used. In this context this is considerably different than epoxy resin casting because this is a special thermosetting plastic.

Thermoplastics are intended to mean the usual modern plastics which are capable of plastic injection molding. Owing to the fact that the disclosure now makes it possible also to use thermoplastics, insulating sleeves for vacuum interrupter chambers can now be matched individually technically to all possible conditions. This is not possible with epoxy resins, or only to a very restricted extent.

Furthermore, in accordance with the mentioned method, thermosetting plastics can be processed. In this case, the emphasis according to the disclosure is on injection-molding technology. That is not epoxy resin casting of the conventional type.

With the method according to the disclosure, rubber-elastic plastics can also be processed for the mentioned purpose.

In the method according to the disclosure, plastic embedding of the component part or the unit can also furthermore be provided which encases the latter with a compensating layer.

In a further exemplary configuration, it is provided that, in order to achieve good adhesion properties, a bonding agent is used in the region of one or else more boundary layers. The permanent adhesion of the surfaces to one another is thereby ensured, which is particularly important as regards the insulation for dielectric reasons.

Good adhesion can also be achieved by virtue of the fact that the boundary faces can be doped, for example, by means of a dipping, spraying, coating or plasma process, with the result that correspondingly good adhesion to the boundary faces is produced.

In a further exemplary configuration it is provided that the insulating sleeve of the breaker component part comprises at least two plastic layers, which are applied successively. A composite material is thus produced which can be matched in a suitable manner to particular requirements. This is possible in a particularly simple manner in the case of breaker pole parts as a result of the use according to the disclosure of the plastic injection-molding technology.

In a further exemplary configuration, it is provided that first a rubber-elastic layer is applied to the component part or to the vacuum chamber, which are encapsulated by injection molding with a plastic, and then is provided with further layers of a plastic.

In a further exemplary configuration it is provided that, in order to bring the coefficient of expansion of the insulating sleeve close to the material of the vacuum interrupter chamber, the plastic is mixed with additives such as particles, spheres, hollow spheres or fibers of ceramic materials or glass prior to being introduced into the injection molding. With these additives it is possible in a very simple manner to configure individual material properties in a very simple manner.

Particular advances are made in terms of manufacturing technology by virtue of the fact that the breaker pole parts are now encapsulated with a thermosetting plastic which is capable of being injection molded. If corresponding plastics (even with fillers: particles and/or fibers) are selected, these may also have a comparable coefficient of thermal expansion to the metal used or the ceramic material. Plastics to be processed by means of injection molding include: pourable materials, bulk molding compounds and others.

In this case, it is particularly surprising in accordance with the disclosure to be able to encase a vacuum interrupter chamber which substantially comprises a ceramic material under the conditions of plastic injection molding at all. The parameters occurring during the plastic injection molding mean enormously increased loading of the vacuum interrupter chamber. In this case, the process is carried out at more than 100 bar pressure loading, in complete contrast to in the case of epoxy resin casting.

Long series of tests in this regard have yielded the surprising result that this is possible without the vacuum interrupter chamber being destroyed, however.

When using such compounds it has been found that, in contrast to in the case of epoxy resin, in addition a compensating layer with a very thin wall can now also be selected for ensuring a dielectrically tight join (for example a bonding agent) as a result of the similarity of the coefficients of thermal expansion. In the simplest case, however, no compensating layer is selected.

Thermal cycling now no longer results in cracking of the casting sheath. The casting compound comprising the mentioned thermosetting plastic injection-molding materials can be sprayed directly onto the vacuum interrupter chamber or else onto a very thin-walled compensating layer which are located on the surface of the unit to be cast.

The injection molding processes known per se are intended also to mean special injection-molding processes such as compression-molding, transfer-molding or injection-molding processes. The materials which can be processed can be present as granules, rods, pasty or else liquid compounds. In addition to "single-layered" encapsulation by injection molding or casting, "multi-layered" encapsulation can also be carried out for producing the component part. The plastics can also have a comparable coefficient of thermal expansion to the metal used or the ceramic material even when fillers are used: for example, particles, spheres, hollow spheres and/or fibers.

When encapsulating a vacuum interrupter chamber with a rubber-elastic material, the production process is matched to the corresponding material. The production times (cycle times) of each component part, for example produced using the hand-casting, vacuum-casting or low-pressure method, are correspondingly long until curing of the component part and its removal.

The use of rubber-elastic materials in the direct injection-molding process is also advantageous. If corresponding materials (also with fillers: particles, spheres, hollow spheres and/or fibers) are selected, these can also take on mechanical functions in addition to increasing the external dielectric strength of the unit. The materials which are processed using injection-molding technology include, for example, silicone materials and others.

In order to achieve good adhesion properties, said bonding agents can be used.

Possibilities in this regard consist in doping the boundary faces by means of dipping processes, so that correspondingly good adhesion to the boundary faces is produced. Manufacture is thereby considerably simplified. This can be seen if the manufacturing steps now present according to the disclosure are compared with those from the prior art.

In the method according to the disclosure, the correspondingly prepared vacuum interrupter chamber is introduced into an injection mold and then the thermosetting or rubber-elastic plastic is applied directly to the corresponding unit. The curing time of the component part produced in this method is shorter than the reaction time of the component part produced using epoxy resin. In the case of epoxy resin, a plurality of base components, namely resin, curer, filler, accelerator, flexibilizer and dye, need to be admixed which only together result in the casting resin and react with one another in a heated mold (at least in part). It is necessary that the resin, curer, filler, which may be organic or inorganic, are transferred to a reactive mixture under vacuum and at a corresponding temperature, with the addition of an accelerator and possibly additives. For complete coverage, the component part needs to undergo post-curing, which can last several hours.

In contrast to this, the thermosetting plastic injection-molding technique or else using a rubber-elastic material makes this method step from the prior art completely obsolete and nevertheless produces as a result a pole part which has the abovementioned properties and in addition is resistant to thermal cycling, in the same way as a pole part which has been encased with epoxy resin and with a compensating layer.

Overall, the advantages with the method according to the disclosure result in the fact that smaller wall thicknesses can be used, greater degrees of freedom in the shaping of the component parts are provided and a smaller component part weight can be achieved given correspondingly selected small wall thicknesses, with the result that overall less material also needs to be used.

Using the plastic injection-molding technique, dimensional accuracies and a high standard as regards quality assurance measures in production of the component part are significantly higher than in the case of epoxy resin casting. During manufacture, short cycle times can be realized which result in an increase in the manufacturing capacity (productivity). As a result, lower costs per item are achieved when producing plastic component-part units. This process can additionally be automated easily with the aid of available standard components.

The mentioned advantages are embodied by the breaker pole part according to the disclosure.

FIG. 1 shows, schematically, a vacuum interrupter chamber. Contact pieces and drive component parts such as drive rods are not illustrated. The vacuum interrupter chamber and the connection contacts are inserted into an injection mold, fixed and then encapsulated by injection molding. In this case, the vacuum interrupter chamber can be provided with a bonding agent, promoting substances or dopants for the purpose of doping boundary faces and for better adhesion, which substances produce a corresponding mechanical and adhesive connection via the penetration depth to the vacuum interrupter chamber boundary face and into the plastic.

At the end of the injection-molding process, the mold is opened and the finished breaker pole part is removed.

FIG. 1 therefore shows the sketch of a pole part comprising a vacuum interrupter chamber (1) and the encapsulation (2). The encapsulation (2) shows, in cross section, the thermosetting or rubber-elastic plastic, which is sprayed onto the component part (1) in a mold.

Figure 2:
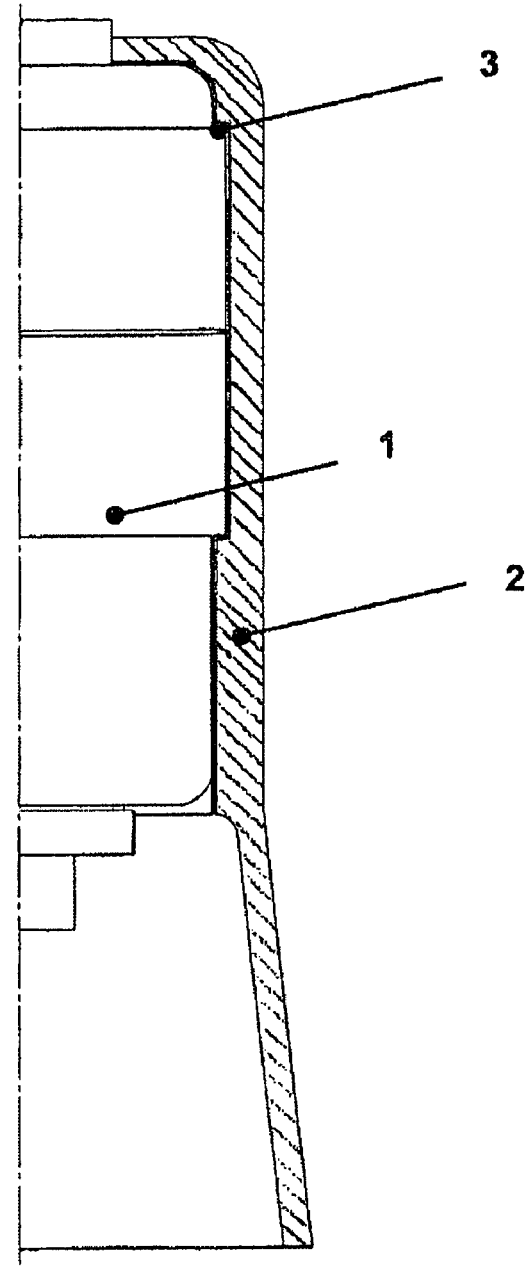

FIG. 2 shows a compensating layer on the vacuum interrupter chamber (1) illustrated here, which compensating layer is applied to the component part to be cast as described above. The thermosetting or rubber-elastic plastic is sprayed onto the compensating layer (3).

Figure 3:
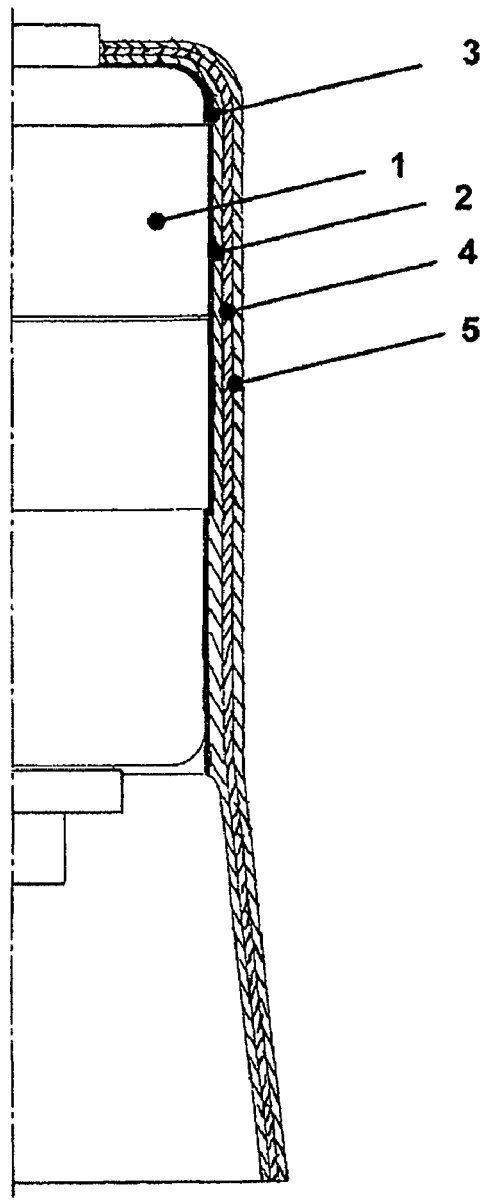

FIG. 3 illustrates a pole part which, in addition to the vacuum interrupter chamber (1), is coated with a plurality of layers of plastic. The vacuum interrupter chamber can be coated with a compensating layer (3). However, it is also possible for the component part shown in FIG. 1 not to be coated. That is to say that the multi-layered structure is formed by the plastic layers (2, 4 and 5).

Figure 4:
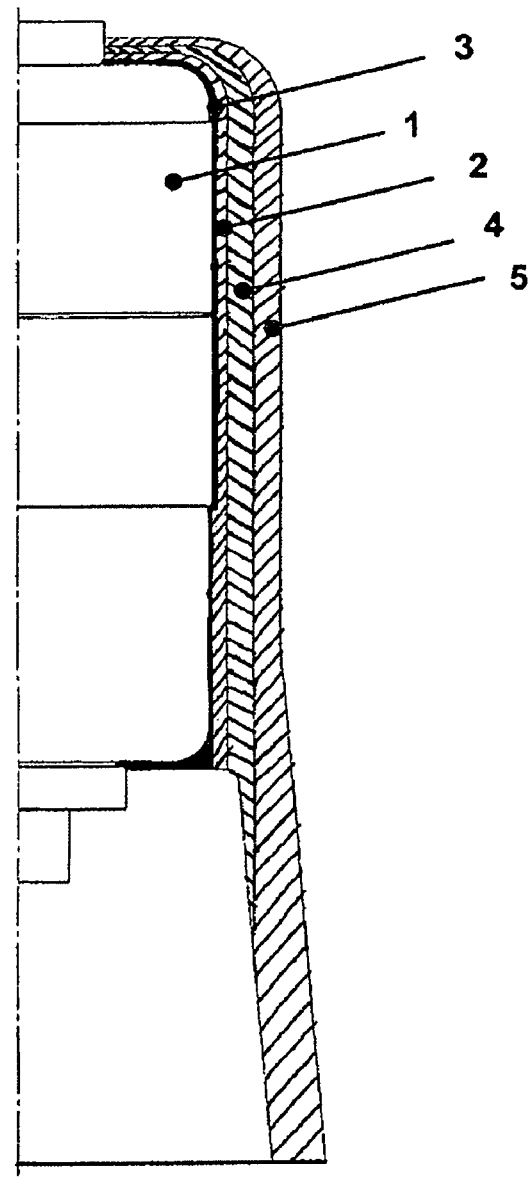

A gradient region may also be present, as is illustrated in FIG. 4.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A method for producing breaker pole parts with a vacuum interrupter chamber and an external insulating sleeve for medium-voltage and high-voltage breakers, comprising:
   producing the external insulating sleeve in a plastic injection-molding process by encapsulating the vacuum chamber through injection molding at a pressure greater than 80 bar.

2. The method as claimed in claim 1,
   wherein the producing of the external insulating sleeve comprises producing the insulating sleeve from a thermoplastic.

3. The method as claimed in claim 2, comprising:
   prior to the encapsulation of the vacuum chamber through injection molding, encasing the vacuum chamber with a compensating layer.

4. The method as claimed in claim 2, comprising:
   introducing a bonding agent in a region of one or more boundary layers, to achieve good adhesion properties.

5. The method as claimed in claim 1,
   wherein the producing of the external insulating sleeve comprises producing the insulating sleeve from a thermosetting plastic.

6. The method as claimed in claim 5, comprising:
   prior to the encapsulation of the vacuum chamber through injection molding, encasing the vacuum chamber with a compensating layer.

7. The method as claimed in claim 5, comprising:
   doping boundary faces to achieve good adhesion to the boundary faces.

8. The method as claimed in claim 1,
   wherein the producing of the external insulating sleeve comprises producing the insulating sleeve from a rubber-elastic plastic.

9. The method as claimed in claim 8, comprising:
   introducing a bonding agent in a region of one or more boundary layers, to achieve good adhesion properties.

10. The method as claimed in claim 1, comprising:
    doping boundary faces to achieve good adhesion to the boundary faces.

11. The method as claimed in claim 10, wherein the doping comprises at least one of a dipping process, a spraying process, a coating process, and a plasma process.

12. The method as claimed in claim 10,
    wherein the producing of the external insulating sleeve comprises successively applying at least two plastic layers.

13. The method as claimed in claim 1, comprising:
    applying a rubber-elastic layer to a component part or to the vacuum chamber, prior to encapsulation of the vacuum chamber through injection molding, wherein the encapsulation further comprises applying layers of a plastic.

14. The method as claimed in claim 13, comprising:
mixing the plastic with additives prior to the injection molding, to bring a coefficient of expansion of the insulating sleeve close to a coefficient of expansion of a material of the vacuum interrupter chamber.

15. The method as claimed in claim 14, wherein the additives comprise at least one of particles, spheres, hollow spheres, and fibers of ceramic materials or glass.

16. The method as claimed in claim 1, wherein the injection molding is at a temperature of approximately 160° C.

17. A method for producing breaker pole parts with a vacuum interrupter chamber and an external insulating sleeve for medium-voltage and high-voltage breakers, comprising:
producing the external insulating sleeve in a plastic injection-molding process by encapsulating the vacuum chamber through injection molding, the producing of the external insulating sleeve comprising successively applying at least two plastic layers.

18. The method as claimed in claim 17, comprising:
applying a rubber-elastic layer to a component part or to the vacuum chamber, prior to encapsulation of the vacuum chamber through injection molding, wherein the encapsulation further comprises applying layers of a plastic.

19. A breaker pole part for medium-voltage and high-voltage breakers, comprising:
a vacuum interrupter chamber; and
an insulating sleeve,
wherein the insulating sleeve comprises one or more layers applied to the vacuum chamber in a plastic injection-molding process at a pressure greater than 80 bar.

20. The breaker pole part as claimed in claim 19,
wherein the insulating sleeve in at least one of the layers comprises a thermoplastic.

21. The breaker pole part as claimed in claim 19,
wherein the insulating sleeve in at least one of the layers comprises a thermosetting plastic.

22. The breaker pole part as claimed in claim 19,
wherein the insulating sleeve in at least one of the layers comprises a rubber-elastic material.

23. The breaker pole part as claimed in claim 22,
wherein the insulating sleeve comprises at least two plastic layers lying one on top of the other.

24. A breaker pole part for medium-voltage and high-voltage breakers, comprising:
a vacuum interrupter chamber; and
an insulating sleeve,
wherein the insulating sleeve comprises one or more layers applied to the vacuum chamber in a plastic injection-molding process, wherein the insulating sleeve comprises at least two plastic layers lying one on top of the other.

* * * * *